United States Patent
Wang et al.

(10) Patent No.: US 7,228,503 B1
(45) Date of Patent: Jun. 5, 2007

(54) METHOD FOR REMOTE MASK DATA JOBVIEW THROUGH A NETWORK

(75) Inventors: Jui-Ming Wang, Changhua Hsien (TW); Yi-Hsu Chen, Hsinchu (TW); Jeen-Haw Liu, Changhua Hsien (TW); Chung-Sheng Lee, Hsinchu (TW); Jiin-Feng Yeh, Taipei Hsien (TW); Hua-Jen Chen, Chiayi (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 1020 days.

(21) Appl. No.: 09/649,706

(22) Filed: Aug. 25, 2000

(51) Int. Cl.
*G06F 3/00* (2006.01)

(52) U.S. Cl. .................. 715/736; 715/735; 715/733; 715/734; 715/752; 715/964; 715/966; 716/19

(58) Field of Classification Search ........... 345/733, 345/734, 736, 752, 760, 761, 964, 966, 969; 715/733, 734, 736, 752, 760, 761, 964, 966, 715/961; 716/19
See application file for complete search history.

(56) References Cited

U.S. PATENT DOCUMENTS

| | | | | |
|---|---|---|---|---|
| 5,793,764 A | * | 8/1998 | Bartoldus et al. | 370/390 |
| 5,903,732 A | * | 5/1999 | Reed et al. | 709/229 |
| 6,104,392 A | * | 8/2000 | Shaw et al. | 345/749 |
| 6,295,513 B1 | * | 9/2001 | Thackston | 703/1 |
| 6,317,838 B1 | * | 11/2001 | Baize | 713/201 |
| 6,397,117 B1 | * | 5/2002 | Burrows et al. | 700/97 |
| 6,412,009 B1 | * | 6/2002 | Erickson et al. | 709/228 |
| 6,578,188 B1 | * | 6/2003 | Pang et al. | 716/19 |

* cited by examiner

*Primary Examiner*—Weilun Lo
*Assistant Examiner*—Mylinh Tran
(74) *Attorney, Agent, or Firm*—Thomas, Kayden, Horstemeyer & Risley

(57) ABSTRACT

A method for remote mask data jobview through a network featuring 24-hour service, reduced cycle time and lower cost, whereby customers can obtain real time mask data access instead of downloading entire pattern files. Expensive CAD/CAM software is unnecessary for the mask data jobview; instead, only a web browser is required. The method for remote mask data jobview through a network comprising the steps of: storing a mask data file to a jobview computer, wherein drawing software is installed on the jobview computer; logging onto a web server from a customer computer through a first network, wherein a web-based graphic mode emulator is installed on the web server; logging onto the jobview computer from the web server through a second network; using the web-base graphic mode emulator to operate the drawing software; and using a browser installed on the customer computer to operate the drawing software to open and review the mask data file.

28 Claims, 2 Drawing Sheets

METHOD FOR REMOTE MASK DATA JOBVIEW THROUGH A NETWORK

BACKGROUND OF THE INVENTION

FIELD OF THE INVENTION

The present invention relates to mask data jobview, and more particularly to a method for remote mask data jobview through a network.

BACKGROUND

After an IC (integrated circuit) design company delivers an IC structure layout to an IC foundry company, a Mask Data Jobview process will be generally be performed following completion of the mask data files by the IC foundry company. That is, the mask data files will be offered to the IC design company for confirmation. Only after the mask data files are confirmed will the IC foundry company begin the mask manufacturing process. In the above conventional Mask Data Jobview process, if the customers have no drawing software for designing mask data, such as CAD/CAM software like that used by the IC foundry company, the customer must go to a jobview site provided by the IC foundry company. An appointment must be made with the mask house, and then a mask data jobview scheduled at a specific jobview site. This step is inconvenient for customers, especially those who are not located nearby a jobview site. Setting up an appointment and travel time can seriously impact mask manufacture cycle time.

On the other hand, customers who have the same CAD/CAM as the IC foundry company have to spend a great amount of money and time to maintain the software. Furthermore, whether customers perform the jobview at remote sites offered by the IC foundry company or by themselves at their in-house jobview site, mask data files have to be transferred to jobview sites on a specific ftp sever from the mask house's CAD center. This wastes time on file transmission and pre-download.

SUMMARY OF THE INVENTION

The object of the present invention is to solve the above-mentioned problems and to provide a method for remote mask data jobview through a network. Performing mask data jobview through a network can provide 24-hour service and reduces cycle time and cost. An advantage of the present invention is that the customer can obtain real time mask data access instead of needing to download entire pattern files. Furthermore, it is unnecessary for customers to purchase CAD/CAM software for the mask data jobview; instead, only a web browser is necessary. Customers can get their latest mask data through the Internet quickly, easily, anywhere and anytime.

According to the present invention, a method for remote mask data jobview through a network comprises the steps of: storing a mask data file to a jobview computer, wherein drawing software is installed on the jobview computer; logging onto a web server from a customer computer through a first network, wherein a web-based graphic mode emulator is installed on the web server; logging onto the jobview computer from the web server through a second network; using the web-base graphic mode emulator to operate the drawing software; and using a browser installed on the customer computer to operate the drawing software to open and review the mask data file.

BRIEF DESCRIPTION OF THE DRAWINGS

The present invention will be described in detail with reference to the illustrated embodiments and the accompany drawings, in which.

DETAILED DESCRIPTION OF THE PREFERRED EMBODIMENT

A method for remote mask data jobview through a network according to the preferred embodiment of the present invention will now be described.

Figure 1:
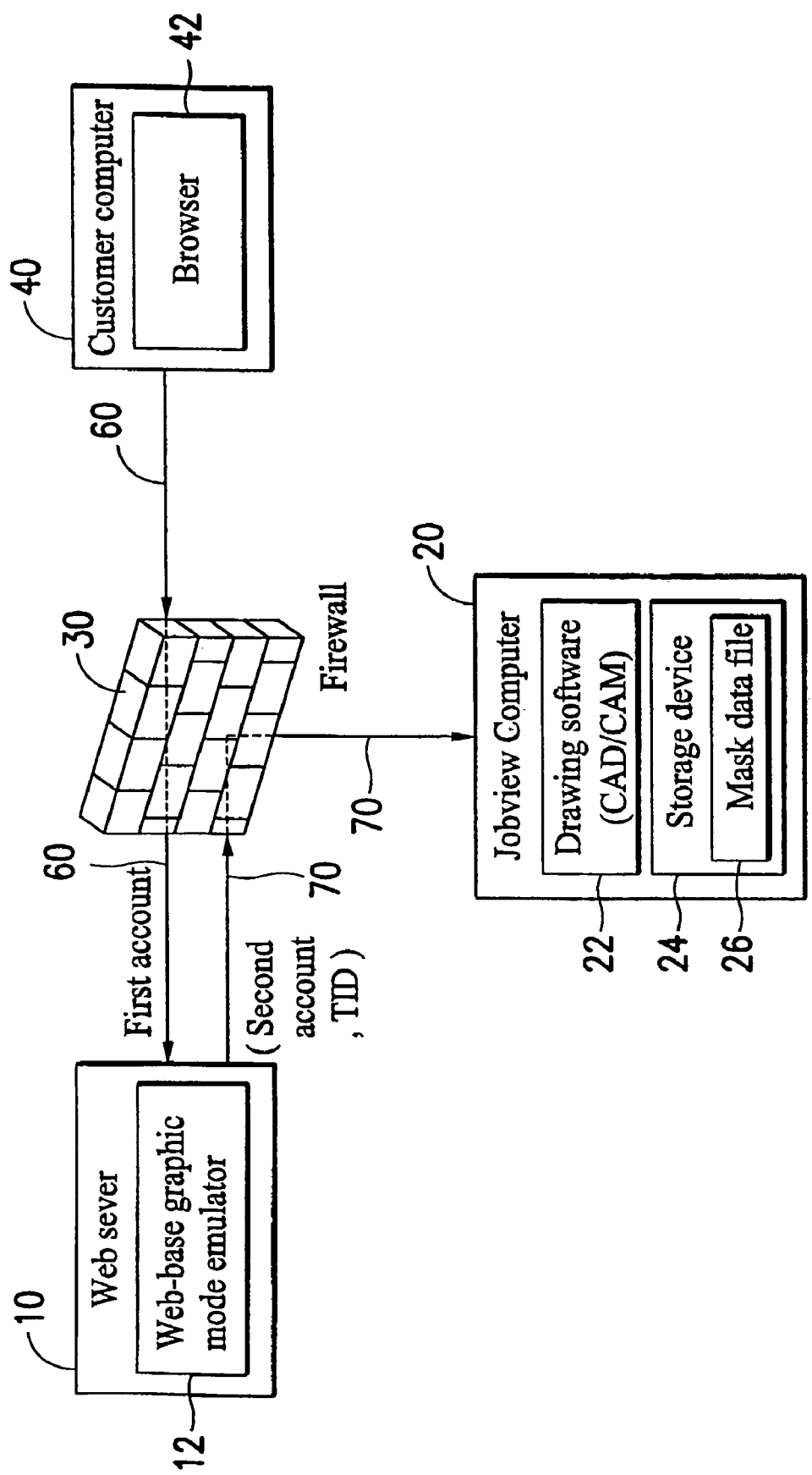
FIG. 1 is a block diagram of the system used for remote mask data jobview through a network in the preferred embodiment.

FIG. 1 is a block diagram of the system used for remote mask data jobview through the network in the preferred embodiment. As shown in FIG. 1, the system includes a web server 10, a jobview computer 20, a firewall 30 and a customer computer 40. The customer computer 40 and the web server 10 are linked via a first network 60, such as Internet, Intranet, local area network (LAN), wide area network (WAN) or the other types of networks. A protocol of the first network 60 includes http (hypertext transmission protocol), SSL (Secure Socket Layer) telnet, rexec (remote execute), rlogin (remote login), rcmd (remote command), rsh (remote shell) and ssh. Then, the web server 10 and the jobview computer 20 are linked via a second network 70, such as Internet, Intranet, local area network, wide area network or the other types of networks. A protocol of the second network 70 includes http, SSL, telnet, rexec, rlogin, rcmd, rsh and ash. In FIG. 1, only one customer using the customer computer 40 is illustrated for simplification. However, it is understood by those skilled in the art that the system can concurrently serve a plurality of customers using their own computers to perform the remote mask data jobview procedures described later.

The web server 10 and the jobview computer 20 can be any type of computer system or a series of computers or servers.

The operating system of the web server 10 and the jobview computer 20 can be any operation system, like UNIX. A web-base graphic mode emulator 12, such as a web-base X-windows emulation, is installed on the web sever 10. Drawing software 22, such as CAD/CAM (computer-aided design/computer-aided manufacturing) software, is installed on the jobview computer 20. The jobview computer 20 also has a storage device 24, such as a disk array, for storing a mask data file 26. The customer computer 40 can be any type of computer systems and can use any operating system on it. A browser 40 is installed in the customer computer 40. A firewall 30 is set between web sever 10 and customer computer 40 and between web sever 10 and jobview computer 20 for preventing hackers from intruding.

For example, when logging onto the web server 10 from the customer computer 40 through the first network 60, the firewall 30 needs to be passed. The firewall 30 has a first rule, as shown in table 1, to limit the customer computer 40 logging onto the web server 10 through the first network. The first rule may include the limitations that the source IP be the IP address of the customer computer 40, the destination IP be the IP address of the web sever 10, and the transmission protocol be a secure transmission protocol, such as SSL.

Moreover, when logging onto the jobview computer 20 from the web server 10 through the second network 70, the firewall 30 again needs to be passed. Thus, the firewall 30 has a second rule, as shown in table 1, to limit the web server 10 logging onto the jobview computer 20 through the second network. The second rule may include the limitations that the source IP be the IP address of the web sever 10, the destination IP be the IP address of the jobview computer 20 and the transmission protocol be telnet.

TABLE 1

| Firewall setting rule | Source IP | Destination IP | Service |
| --- | --- | --- | --- |
| First rule | Customer computer | Web server | SSL |
| Second rule | Web server | Jobview computer | Telnet |

In other words, from the customer computer 40 through the first network 60 login the web server 10, the firewall 30 needs to be passed to limit the transmission protocol to a secure transmission protocol, such as SSL. From the web server 10 through the second network 70 login the jobview computer 20, the firewall 30 needs to be passed to limit the transmission protocol to telnet.

Figure 2:
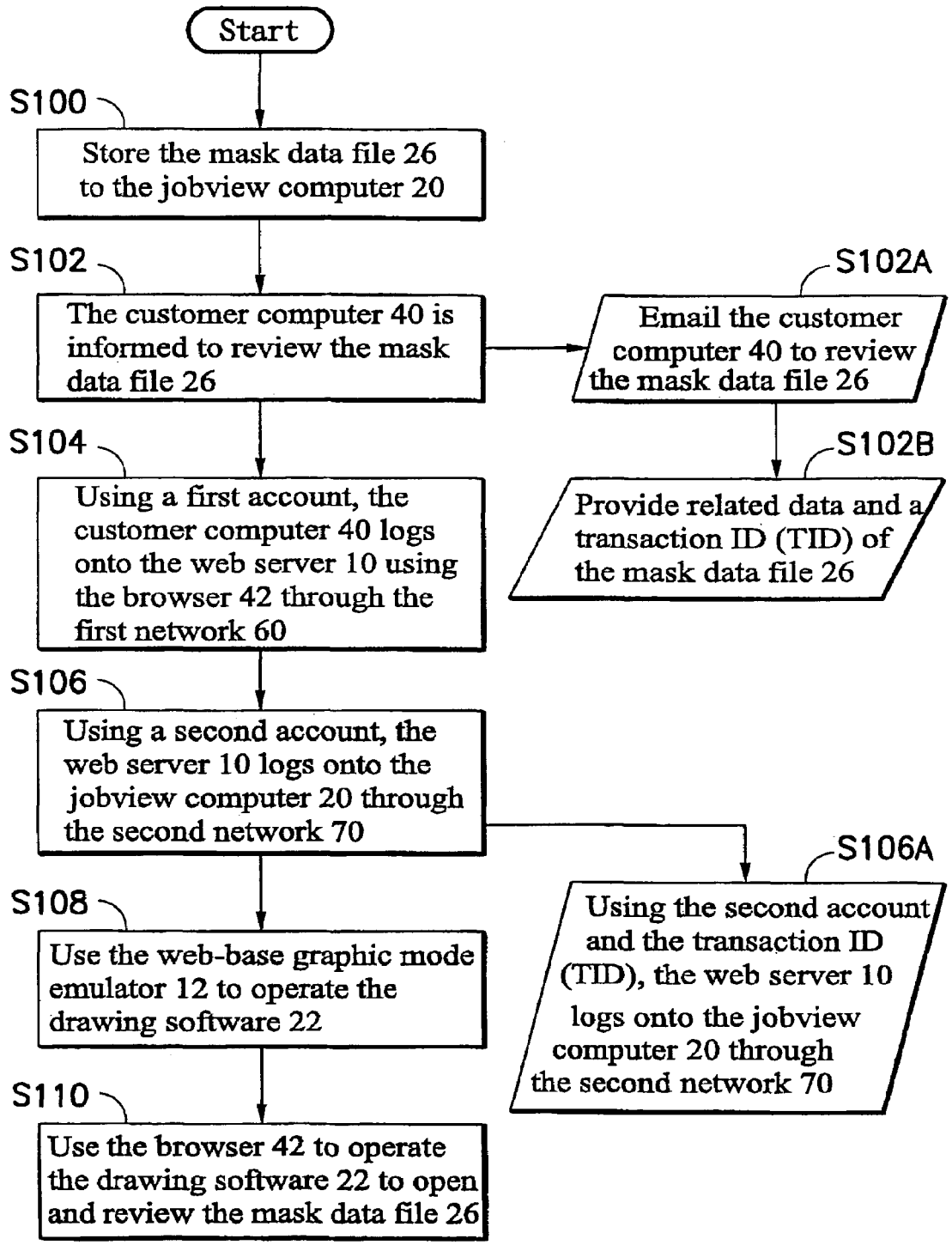
FIG. 2 is a flow chart showing the steps for remote mask data jobview through a network in the preferred embodiment.

Referring to FIG. 2 a flow chart showing the steps for remote mask data jobview through a network in this invention is illustrated. The process first stores the mask data file 26, drawn by the software 22, such as CAD/CAM software, to the storage device 24 of the jobview computer 20, as shown in step S100.

In step S102 (optional), the customer computer 40 is informed to review the mask data file 26. The method of informing the customer computer 40 can be performed by email, as shown in step S102A, and providing related data and a transaction ID (TID) of the mask data file 26, as shown in step S102B.

In step S104, using a first account, the customer computer 40 logs onto the web server 10 using the browser 42 through the first network 60. In order to prevent hackers from intruding, the firewall 30 needs to be passed to limit the transmission protocol to a secure transmission protocol, such as SSL, during this process.

In step S106, using a second account, the web server 10 logs onto the jobview computer 20 through the second network 70. In step S106A, using the second account and the transaction ID (TID), the web server 10 logs onto the jobview computer 20 through the second network 70. In order to prevent hackers from intruding, the firewall 30 needs to be passed to limit the transmission protocol to telnet, during this process.

In step 108, use the web-base graphic mode emulator 12, such as a web-base X-windows emulation, to operate the drawing software 22, such as CAD/CAM software.

Finally, in step 110, use the browser 42 to operate the drawing software 22 to open and review the mask data file 26.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description.

It is therefore contemplated that the appended claims will cover any such modifications or embodiments as may fall within the scope of the invention defined by the following claims and their equivalents.

What is claimed is:

1. A method of mask fabrication, comprising the steps of:
providing a mask data file to be previewed through a first network from a customer computer;
utilizing a web-base graphic mode emulator on a web server to operate a drawing software for opening and previewing the mask data file, wherein the drawing software and the mask data file are stored in a first computer which is coupled to the web server through a second network;
accepting a verification of said mask data file; and
fabricating a mask according to the verified said mask data file.

2. The method as recited in claim 1, wherein the providing step further comprises sending an email to a customer computer to preview the mask data file.

3. A mask fabricated according to the method of claim 2.

4. The method as recited in claim 1 further comprising performing authorization processes on the web server and the first computer.

5. The method as recited in claim 4, wherein said authorization processes comprise receiving an account and a transaction ID.

6. A mask fabricated according to the method of claim 5.

7. A mask fabricated according to the method of claim 4.

8. The method as recited in claim 1 further comprising providing a firewall performing a first rule to secure said web server.

9. The method as recited in claim 8, wherein said first rule comprises limitations that the source IP of an access packet be the IP address of a designated customer computer, the destination IP of said packet be the IP address of said web sever and the transmission protocol corresponding to said packet be a secure transmission protocol.

10. The method as recited in claim 9, wherein said secure transmission protocol comprises a Secure Socket Layer.

11. A mask fabricated according to the method of claim 10.

12. A mask fabricated according to the method of claim 9.

13. A mask fabricated according to the method of claim 8.

14. The method as recited in claim 1 further providing a firewall performing a second rule to secure the first computer.

15. The method as recited in claim 14, wherein said second rule comprises limitations that the source IP of an access packet be the IP address of said web server, the destination IP of said packet be the IP address of the first computer and the transmission protocol corresponding to said packet be telnet.

16. A mask fabricated according to the method of claim 15.

17. A mask fabricated according to the method of claim 14.

18. A mask fabricated according to the method of claim 1.

19. A semiconductor product fabrication process, comprising the steps of:
providing a mask data file to be previewed through a first network from a customer computer;
utilizing a web-base graphic mode emulator on a web server to operate a drawing software for opening and previewing the mask data file, wherein the drawing software and the mask data file are stored in a first computer which is coupled to the web server through a second network;

accepting a verification of said mask data file; and fabricating a mask according to the verified said mask data file; and manufacturing a semiconductor product according to the verified said mask data file.

20. The semiconductor product fabrication process as recited in claim 19, wherein the providing step further comprises sending an email to a customer computer to preview the mask data file.

21. The semiconductor product fabrication process as recited in claim 19 further comprising performing authorization processes on the web server and the first computer.

22. The semiconductor product fabrication process as recited in claim 21, wherein said authorization processes comprise receiving an account and a transaction ID.

23. The semiconductor product fabrication process as recited in claim 19 further comprising providing a firewall performing a first rule to secure said web server.

24. The semiconductor product fabrication process as recited in claim 23, wherein said first rule comprises limitations that the source IP of an access packet be the IP address of a designated customer computer, the destination IP of said packet be the IP address of said web sever and the transmission protocol corresponding to said packet be a secure transmission protocol.

25. The semiconductor product fabrication process as recited in claim 24, wherein said secure transmission protocol comprises a Secure Socket Layer.

26. The semiconductor product fabrication process as recited in claim 19 further providing a firewall performing a second rule to secure the first computer.

27. The semiconductor product fabrication process as recited in claim 26, wherein said second rule comprises limitations that the source IP of an access packet be the IP address of said web server, the destination IP of said packet be the IP address of the first computer and the transmission protocol corresponding to said packet be telnet.

28. The semiconductor product fabrication process as recited in claim 27, further comprising performing authorization process on the web server and the first computer.

* * * * *